United States Patent
Woo et al.

(10) Patent No.: US 7,221,264 B2
(45) Date of Patent: May 22, 2007

(54) METHOD FOR ADJUSTING INTERIOR ILLUMINATION

(75) Inventors: Victor Woo, Columbus, OH (US); Takeo Kihana, New Albany, OH (US); Masaya Yoneyama, Columbus, OH (US); Brian Stull, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 11/109,878

(22) Filed: Apr. 20, 2005

(65) Prior Publication Data

US 2006/0239016 A1  Oct. 26, 2006

(51) Int. Cl.
*B60Q 1/00* (2006.01)

(52) U.S. Cl. .................................. 340/438; 340/425.5

(58) Field of Classification Search ............. 340/425.5, 340/438, 468, 469, 471; 345/102, 207, 690; 359/602, 603, 304
See application file for complete search history.

(56) References Cited

U.S. PATENT DOCUMENTS

| | | | |
|---|---|---|---|
| 3,879,617 A * | 4/1975 | Faller | 307/10.8 |
| 5,583,484 A | 12/1996 | Asano | |
| 5,877,897 A * | 3/1999 | Schofield et al. | 359/604 |
| 6,302,545 B1 * | 10/2001 | Schofield et al. | 359/601 |
| 6,326,900 B2 | 12/2001 | DeLine et al. | |
| 6,523,964 B2 * | 2/2003 | Schofield et al. | 359/601 |
| 6,762,741 B2 * | 7/2004 | Weindorf | 345/102 |
| 6,802,617 B2 * | 10/2004 | Schofield et al. | 359/601 |
| 6,943,342 B2 * | 9/2005 | Bechtel et al. | 250/239 |
| 6,953,253 B2 * | 10/2005 | Schofield et al. | 359/604 |
| 2003/0214242 A1 | 11/2003 | Berg-johansen | |

FOREIGN PATENT DOCUMENTS

JP          4143134          5/1992

* cited by examiner

*Primary Examiner*—Van T. Trieu
(74) *Attorney, Agent, or Firm*—Plumsea Law Group, LLC; Mark E. Duell

(57) ABSTRACT

A method for altering interior illumination in a motor vehicle includes provisions for adjusting the interior lighting conditions to improve visibility of the illuminated objects under different ambient lighting conditions. In some cases, the method can also include provisions that adjust interior lighting conditions quickly if sudden changes in ambient light are detected.

11 Claims, 7 Drawing Sheets

METHOD FOR ADJUSTING INTERIOR ILLUMINATION

BACKGROUND OF THE INVENTION

1. Field of the Invention

This invention relates to the field of motor vehicles, and more particularly, to a system and method for providing adjusting the interior illumination in a motor vehicle.

2. Related Art

Motor vehicles generally provide some kind of interior illumination or lighting. Interior lighting can be provided to a number of different locations and can be used to illuminate different components and systems associated with the interior of a motor vehicle. Some examples of interior illumination include a dome light and a map light. Dome lights generally provide illumination to most of the passenger cabin. This can assist drivers and occupants in entering or exiting a motor vehicle at night time. Map lights can provide directed illumination to assist in reading maps or directions. Unlike dome lights, map lights can be designed to operate while the motor vehicle is in motion.

Other components are also illuminated to assist with visibility during low light conditions. Low light conditions include night time, dawn, dusk and low light conditions caused by objects that obstruct sunlight. Examples of obstructions include trees, woods, bridges, buildings and tunnels. In some cases, certain components are illuminated to assist with their visibility during low light conditions. Some examples of components that are illuminated include switches, the dashboard, the instrument cluster and the center console. These components can be back lit, directly lit or these components can include elements that illuminate like LCD's or LED's.

Various lighting control systems have been proposed. U.S. Pat. No. 5,583,484 to Asano discloses a lighting control apparatus on a control panel in an automobile including brightness control means responsive to an operation of a dimmer knob for giving brightness setting information, for giving a brightness signal for controlling a luminosity of an instrument panel, and for giving a luminosity of the control panel, which is provided near the instrument panel to a luminosity corresponding to the operation of the dimmer knob.

U.S. patent application Ser. No. 2003/0214242 to Berg-Johansen discloses a system for controlling light including a display readable in fall daylight conditions as well as at the other extreme, in complete darkness. Sudden changes in the interior cockpit lighting conditions may occur, such as when the general cockpit lighting is turned on or off or when clouds block direct sunlight. An appropriate amount of backlight illumination is required to ensure consistent, readable avionics displays under a variety of changing lighting conditions.

Japanese Patent Number 4143134 to Takesato and assigned to Mazda, discloses lighting for appliances such as liquid crystals and fluorescent lamps provided for the instrument panel and its peripheries of a vehicle. The lighting appliances are dimmed by dimming commands from a dimming circuit which is operated with both a switch in a small lamp system and a head lamp switch turned on. A dimming adjust circuit is interposed within a control unit and sends a mode signal to the dimming circuit in response to an input from a sunshine sensor so the degree of dimming can be adjusted in response to external brightness.

While the proposed lighting systems discussed above include some features; none of the proposed lighting control systems provides a system that can rapidly respond to sudden changes in ambient lighting conditions. There is currently a need for a system that improves the visibility of interior elements by addressing the noted shortcomings.

SUMMARY OF THE INVENTION

An interior illumination system and method are disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a method for controlling at least one interior illumination device of a motor vehicle comprising an ambient light sensor providing ambient light information related to ambient light, the method comprising the steps of: retrieving the ambient light information from the ambient light sensor; determining when the ambient light information crosses a first threshold; starting a timer; stopping the timer when the ambient light information crosses a second threshold, and computing an elapsed time; comparing the elapsed time with a predetermined time; and altering a condition of the illumination device if the elapsed time is less than the predetermined time.

In another aspect, the condition is related to an illumination level of the interior illumination device.

In another aspect, the first threshold is a lower threshold corresponding to a nighttime ambient light level.

In another aspect, the second threshold is an upper threshold corresponding to a daytime ambient light level.

In another aspect, the illuminated device is switched to a day mode.

In another aspect, the first threshold is an upper threshold corresponding to a daytime ambient light level.

In another aspect, the second threshold is a lower threshold corresponding to a nighttime ambient light level.

In another aspect, the illuminated device is switched to a night mode.

In another aspect, the illuminated device is altered more rapidly than a normal response time.

In another aspect, the illuminated device is altered in about three seconds.

In another aspect, the normal response time is about 30 seconds.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENT(S)

Figure 1:
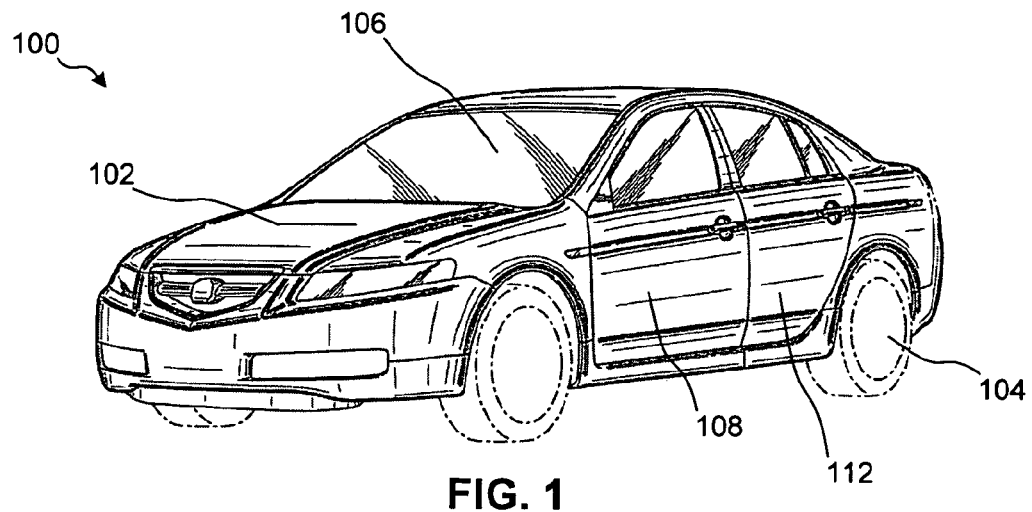
FIG. 1 is a schematic diagram of a preferred embodiment of a vehicle in accordance with the present invention.
Figure 2:
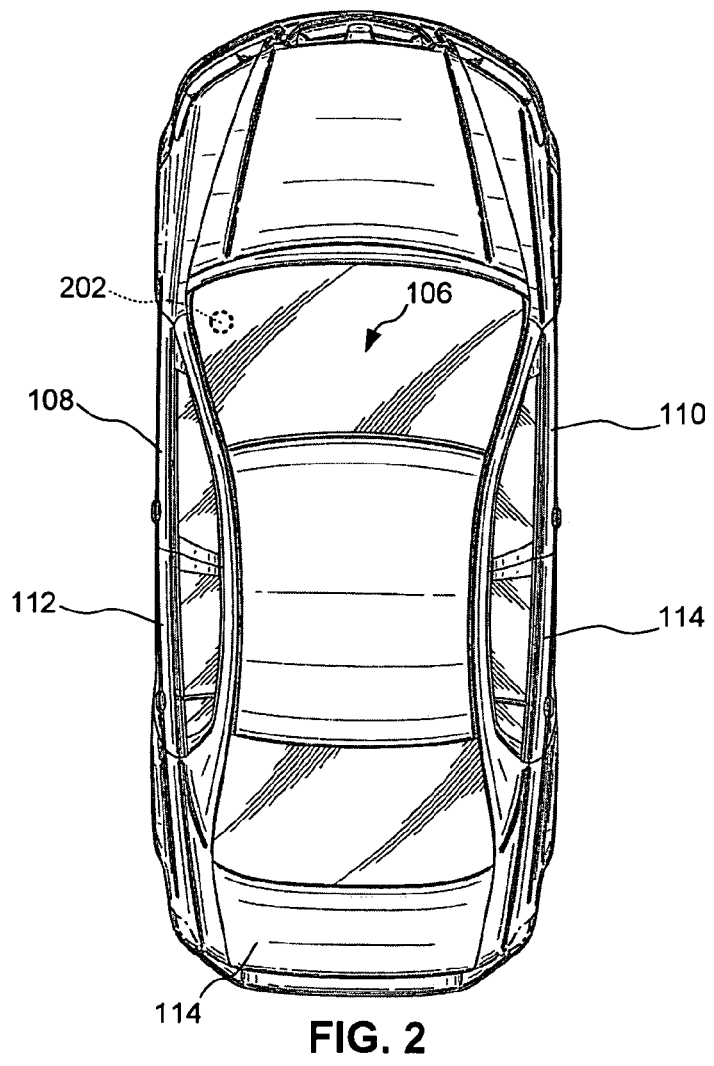
FIG. 2 is a schematic diagram of a preferred embodiment of a vehicle in accordance with the present invention.

FIGS. 1 and 2 are schematic views of a preferred embodiment of a motor vehicle 100. Motor vehicle 100 includes a body 102 and at least one wheel 104. Body 102 includes a passenger cabin or interior 106 and at least one door 108 that provides access to passenger cabin 106. In the embodiment shown in FIGS. 1 and 2, motor vehicle 100 includes four doors, a left front door 108 and a right front door 110, and left rear door 112 and right rear door 114. Other embodiments can include fewer doors and still other embodiments can include additional doors.

Preferably, motor vehicle 100 includes an illumination system 300 (see FIG. 3) and at least one illumination device associated with illumination system 300. Illumination system 300 can include a number of different components. Some of these components are shown schematically in FIG. 3. These different components can be located together or throughout different locations of motor vehicle 100.

Figure 3:
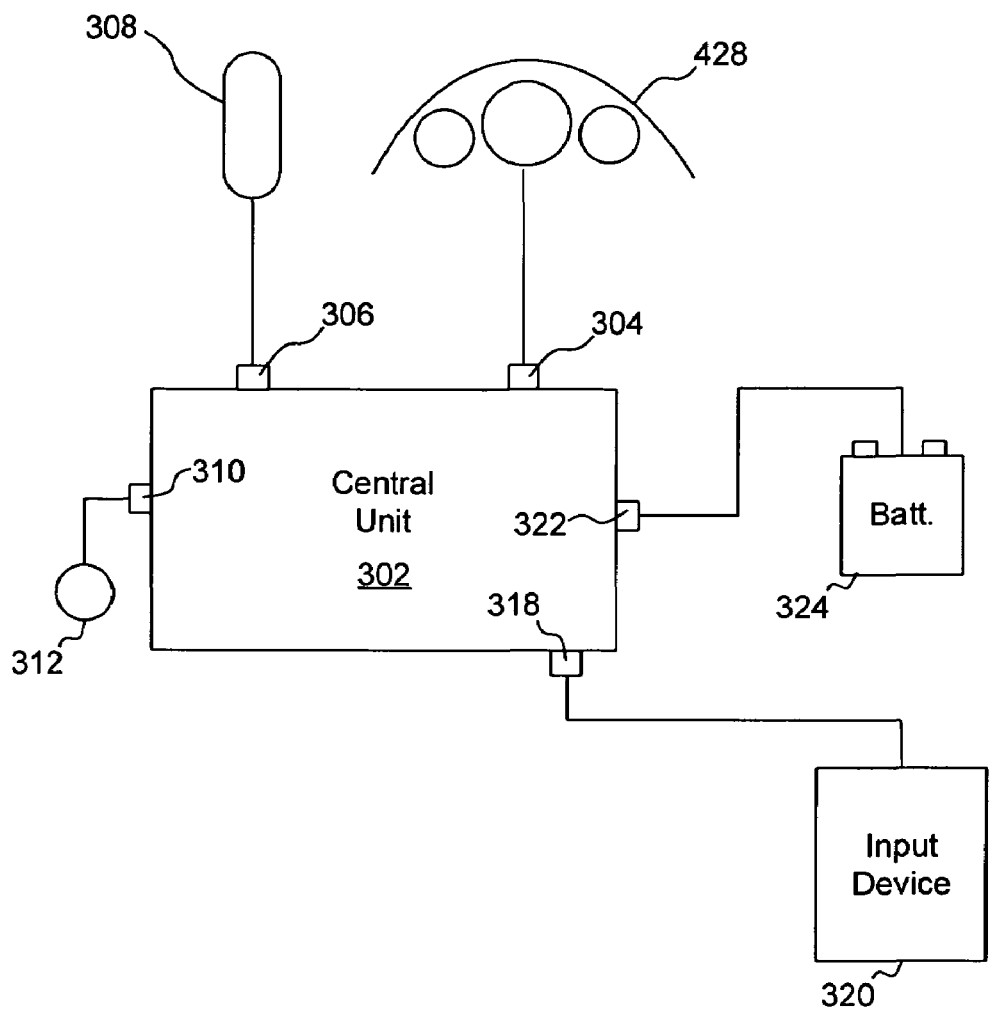
FIG. 3 is a schematic diagram of a preferred embodiment of an illumination system in accordance with the present invention.

Referring to FIG. 3, which shows a schematic diagram of a preferred embodiment of an illumination system 300, illumination system 300 includes a central unit 302. Central unit 302 preferably includes a number of inputs and outputs. Central unit 302 includes a first port 304 that is designed to send a first signal to instrument cluster 428, a second port 308 that is designed to send a second signal to at least one switch 308, and a third port 310 that is designed to receive a information from a light sensor 312.

In some embodiments, the first and second signals can be powered, meaning that the illuminated device, either instrument cluster 428 or switch 308 is actually illuminated by the output of central unit 302. In other embodiments, central unit 302 merely sends information as a signal, and that information is used by the illuminated device to attain a certain brightness level. In this embodiment, one or more of the illuminated devices are self-powered and central unit 302 provides an illumination signal. In still other embodiments, some of the illumination devices are powered by central unit 302 and other illumination devices are self-powered.

Any device or component that receives illumination instructions, information and/or power from central unit 302 can be considered an illuminated component. Although only two illuminated components are provided as an example in the embodiment shown in FIG. 3, many additional elements can also receive illumination information from central unit 302. In some embodiments, fewer than the two illuminated components receive illumination information from central unit 302.

Central unit 302 can also include provisions that facilitate human interaction. To receive information from a user, central unit 302 includes an input port 318 that is capable of communicating with an input device 320. Input device 320 can take on a number of different forms, including a dimmer switch, a thumb wheel and/or a rotary encoder. Preferably input device 320 is capable of assuming a number of different positions and has a range of motion.

A power port 322 that can connect central unit 302 to a power supply 324. In the embodiment shown in FIG. 3, power supply 324 is a battery. In some embodiments, all or most of the items shown in FIG. 3 are housed in a single case or unit. In other embodiments, the various items shown in FIG. 3 are not housed in a single physical case, but instead, are distributed throughout motor vehicle 100 and communicate with one another via known wired or wireless methods. For example, in a system where one or more items communicate wirelessly, the Bluetooth® protocol can be used. Some components of illumination system 300 can be placed out of plain sight.

Figure 4:
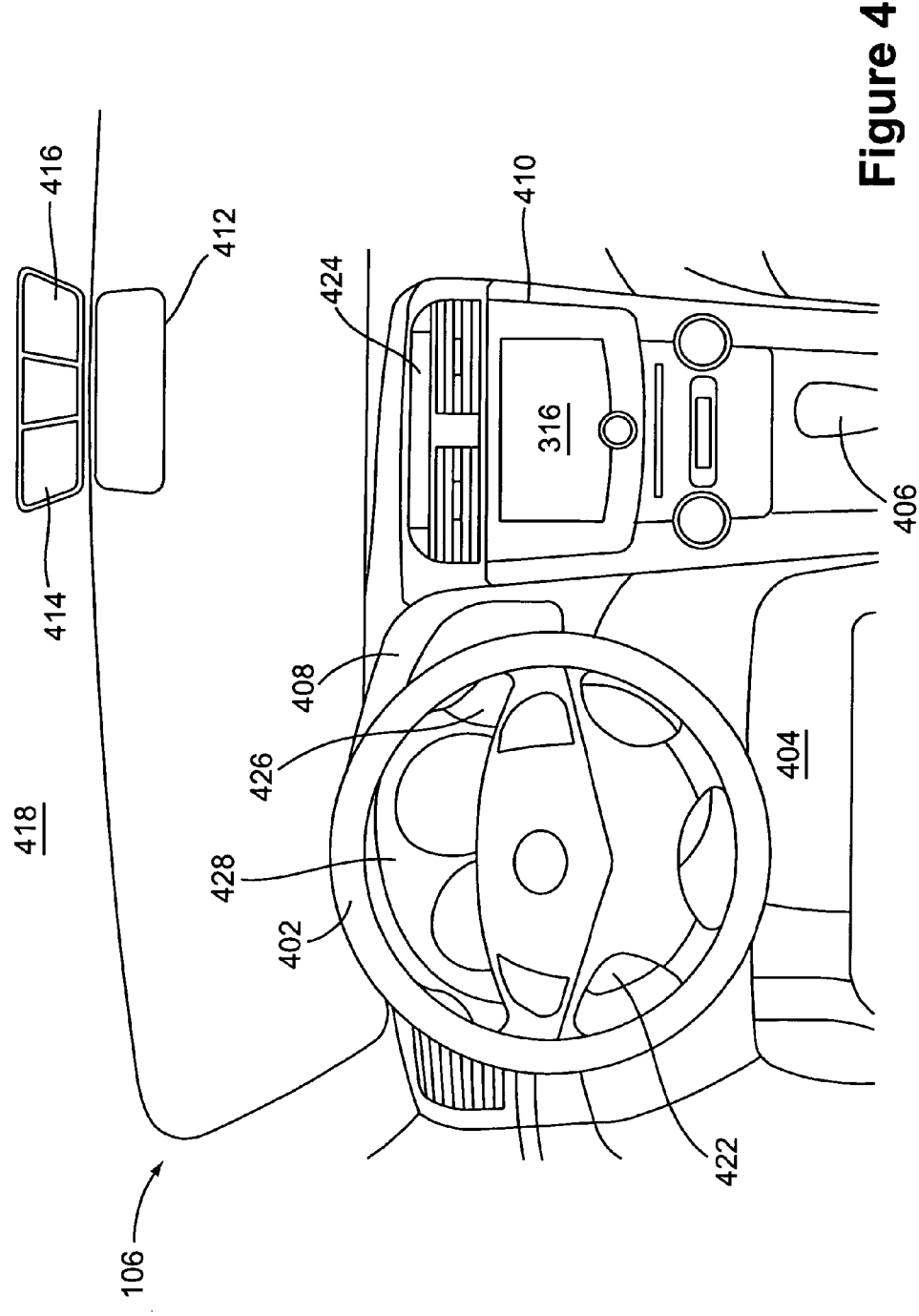
FIG. 4 is a schematic view of the interior of the motor vehicle shown in FIG. 1.

FIG. 4 shows a preferred embodiment of an interior 106 of motor vehicle 100 (see FIG. 1). Interior 106 includes a steering wheel 402, a driver's seat 404, a shifter or gear selector 406, a dashboard 408, a center console 410 and a rear view mirror 412. A control pod 422 can be mounted onto steering wheel 402.

Preferably, interior 106 includes a headliner 418, which includes a driver's map light 414 and a passenger's map light 416. Interior 106 can also include a center console 410, which can include display 316 and a Hands Free Telephone display unit 424. In addition, some embodiments include a multi-function display 426 disposed on dashboard 408. In some embodiments, multi-function display 426 is disposed within instrument cluster 428 on dashboard 408. Instrument cluster 428 can also be referred to as a Combi-meter. In addition to multi-function display 426, instrument cluster 428 can include a speedometer, tachometer and odometer. In some embodiments, instrument cluster 428 includes illuminated gauges and/or illuminated indicia on the gauge faces. These illuminated indicia can include LED's, LCD's, fluorescent elements, conventional light bulbs or other incandescent devices, and/or electro-luminescent elements.

Figure 5:
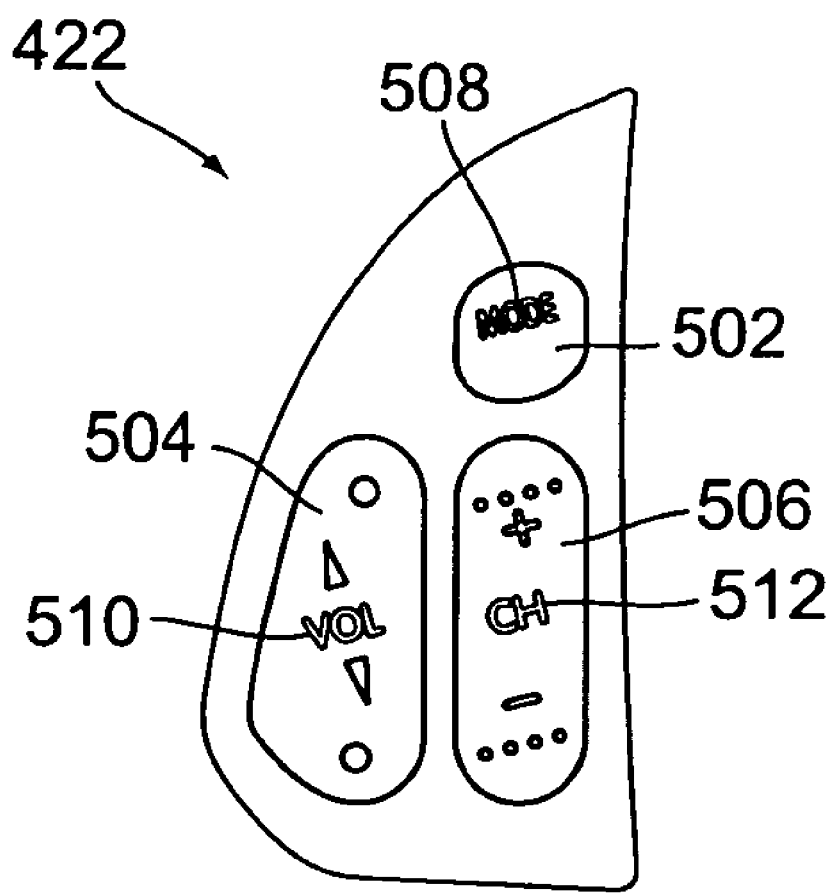
FIG. 5 is a schematic diagram of a preferred embodiment of a control pod.

FIG. 5 is an enlarged schematic diagram of control pod 422, which preferably includes a number of switches. Pod 422 includes mode button 502, volume switch 504 and channel switch 506. Preferably, mode button 502 includes mode indicia 508, volume switch 504 includes volume indicia 510 and channel switch includes channel indicia 512. In a preferred embodiment, all of the indicia can be illuminated, and in an exemplary embodiment, all of the indicia are backlit. The switches shown in control pod 422 are representative of other switches that can be disposed within interior 106 of motor vehicle 100. Other switches include power window switches, power lock switches, audio control switches, headlight and fog light switches to name a few. An example of a group of audio switches is shown in FIGS. 14 and 15. FIG. 14 is an example of a group of audio switches under high ambient illumination conditions, like day time, and FIG. 15 is an example of a group of audio switches under low ambient illumination conditions, like night time. It can be observed that the audio switches in FIG. 15 are illuminated. One or more of these switches can be controlled by control unit 302. In the embodiment shown in FIG. 3, one or more of the switches are represented schematically by switch 308.

The switches can be illuminated in many different ways. The switches can include LED's, LCD's, florescent elements, conventional light bulbs or other incandescent devices, and/or electroluminescent elements. Different switches associated with motor vehicle 100 can be illuminated in different ways and with different kinds of devices.

Figure 6:
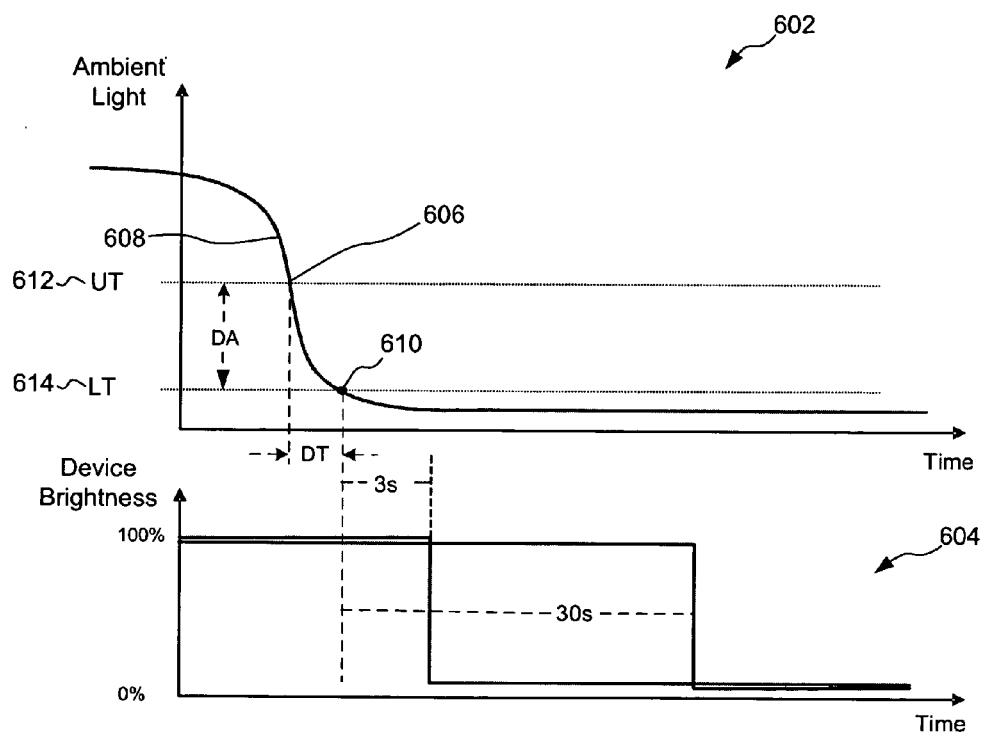
FIG. 6 is a graph of a preferred embodiment of a sensor over a certain period of time.

Some embodiments can include an algorithm referred to as a tunnel algorithm. This algorithm can be used to improve the response of the interior illumination system 300 when entering or exiting a particularly dark condition, for example, a tunnel. The tunnel algorithm can be understood in connection with a series of graphs shown in FIGS. 6 and 7. FIG. 6 is a graph of an example response curve of ambient light sensor 202.

The graph shown in FIG. 6 includes an upper portion 602 and a lower portion 604. Upper portion 602 is a graph of ambient light and time. The vertical Y-axis represents ambient light and the horizontal X-axis represents time. Ambient light can be measured in a variety of different ways. Preferably, light sensor 202 is used to measure ambient light. In some embodiments, light sensor 202 provides a voltage output that is related to ambient light. In these embodiments, the vertical Y-axis can relate to the voltage output of light sensor 202. Lower portion 604 is a graph showing the brightness of an illuminated device over time.

Upper portion 602 includes ambient light curve 608 that shows a situation where the amount of ambient light rapidly decreases over time. In this example, the amount of ambient light shown by curve 608 decreases rapidly, quickly passing upper threshold 612 at 606 and lower threshold 614 at 610. Preferably, these thresholds are used to define daytime and nighttime conditions, respectively.

In the embodiment shown in FIG. 6, any ambient light condition that is equal to or above upper threshold 612 is generally considered a daytime condition and any ambient light condition below lower threshold 614 is generally considered a nighttime condition. These limits can be used to control the illumination characteristics of various illuminated components.

In a preferred embodiment, these limits are also used to determine how quickly the illumination characteristics are changed from one illumination condition (for example, daytime) to a second illumination condition (for example, nighttime). In the example shown in FIG. 6, curve 608 represents a rapid decrease in ambient light. This can occur when motor vehicle 100 enters a tunnel, parking garage or other dark location.

Preferably, illumination system 300 (see FIG. 3) includes provisions for altering the illumination characteristics of one or more illuminated components based how quickly ambient light changes. In a preferred embodiment, one or more illumination characteristics can be changed rapidly if ambient light changes rapidly; and normally if ambient light changes gradually.

Figure 7:
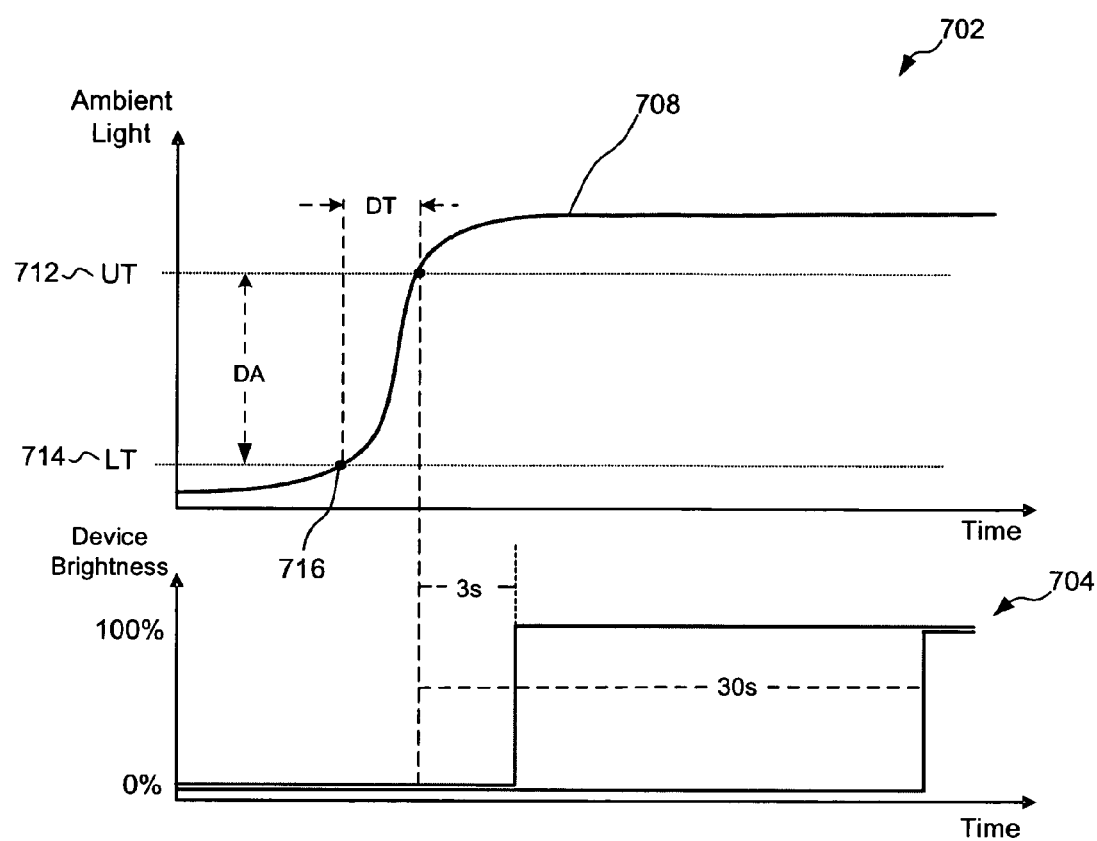
FIG. 7 is a graph of a preferred embodiment of a sensor over a certain period of time.

FIG. 7 is a graph showing a preferred embodiment of an increasing ambient light condition. Like FIG. 6, FIG. 7 includes an upper portion 702 and a lower portion 704. Upper portion 702 is a graph of ambient light over time and lower portion 704 is a graph showing the brightness of an illuminated device over time. Upper portion 704 includes a vertical Y-axis that represents ambient light and the horizontal X-axis represents time.

Upper portion 702 includes ambient light curve 708. Ambient light curve 708 shows a situation where the amount of ambient light rapidly increases over time. Some examples of this are exiting a tunnel, parking garage or other dark location into daylight. In this example, the amount of ambient light increases until upper limit threshold 712 is reached.

As ambient light increases, curve 708 crosses two predetermined thresholds. The first threshold 714 is a lower limit and the second threshold 712 is an upper limit. Preferably, these limits are used to define nighttime and daytime conditions, respectively.

In some embodiments, these limits are also used to determine how quickly the illumination characteristics are changed from one illumination condition to a second illumination condition. In some embodiments, the upper and lower thresholds 612 and 614, respectively, associated with a rapidly decreasing ambient light condition, for example, ambient light curve 606 in FIG. 6 are different than the upper and lower thresholds 712 and 714 associated with a rapidly increasing ambient light condition, for example, ambient light curve 708 in FIG. 7. In some embodiments, the thresholds are similar. Preferably, however, the upper and lower thresholds are different for a rapidly increasing light condition and a rapidly decreasing light condition.

Preferably, illumination system 300 (see FIG. 3) includes provisions for altering the illumination characteristics of one or more illuminated components based how quickly ambient light changes. In a preferred embodiment, one or more illumination characteristics can be changed rapidly if ambient light changes rapidly; and normally if ambient light changes gradually.

Figure 8:
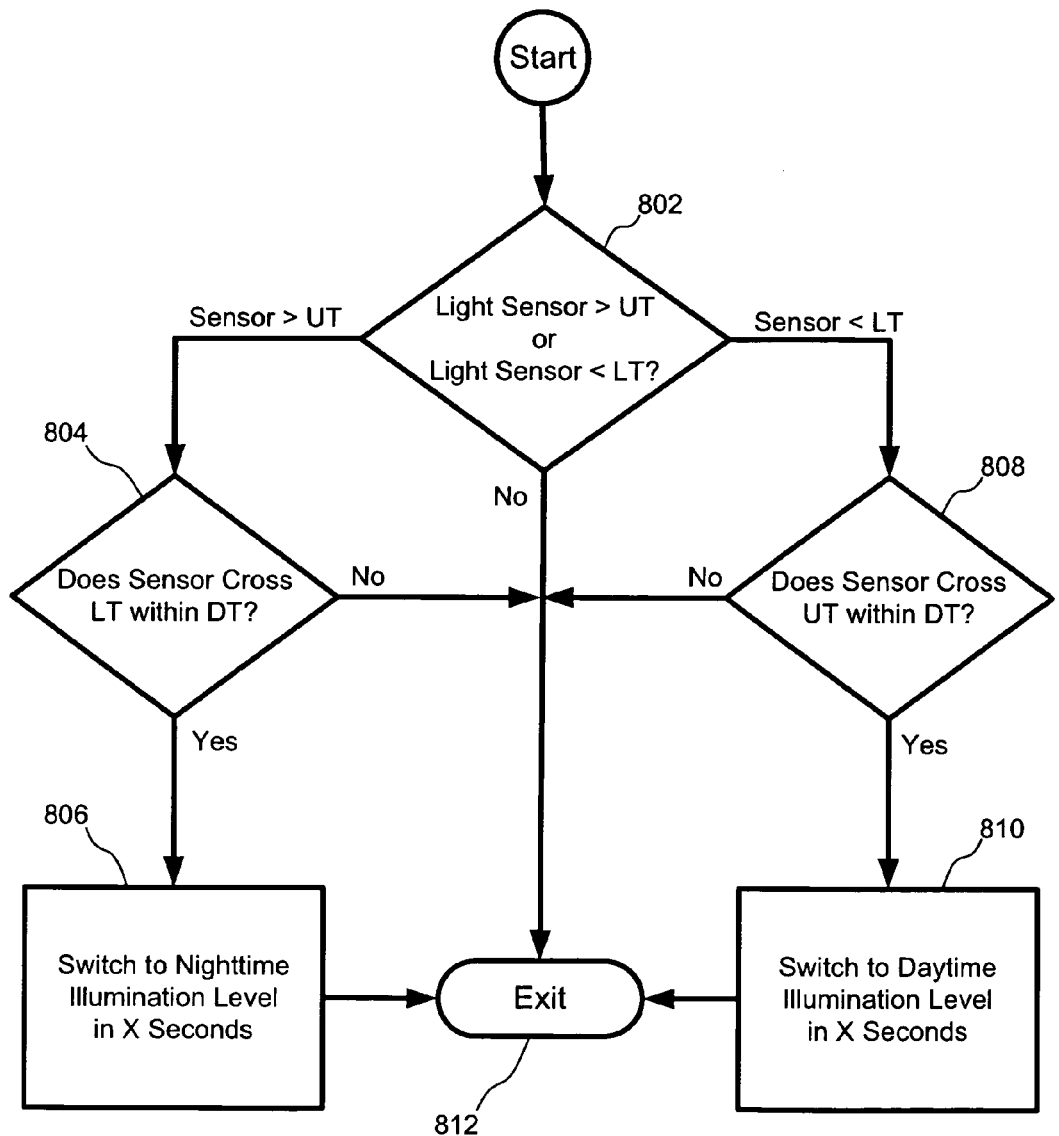
FIG. 8 is a flow diagram of a preferred embodiment of a method for adjusting an illumination level.

The operation of the system will be disclosed in connection with FIG. 8. FIG. 8 is an embodiment of a method for selecting how rapidly to change an illumination condition. Referring to FIGS. 2, 3 and 6–8, the method shown in FIG. 8 starts with step 602 (see FIG. 6), where information is retrieved from light sensor 202. In step 802, the method determines if the amount of ambient light indicated by light sensor 202 is above upper threshold 612 or below lower threshold 714. Recall that, in a preferred embodiment, the upper threshold 612 associated with the "enter tunnel mode" is different than the upper threshold 712 associated with the "exit tunnel mode" and the lower threshold 614 associated with the "enter tunnel mode" is different than the lower threshold 714 associated with the "exit tunnel mode." In this embodiment, upper threshold 612 is used and lower threshold 714 is used, however, any combination of thresholds can be used in various different embodiments.

If the method determines that the amount of light indicated by light sensor 202 is above upper threshold 612, then the method determines how quickly the ambient light condition is decreasing in step 804. Preferably, central unit 302 receives a continuous stream of information, a nearly continuous stream of information, from light sensor 202, or constantly monitors light sensor 202.

In step 804, the method considers the time it takes for the ambient light level to move from upper limit 612 to lower limit 614. If the level of ambient light is able to move from upper limit 612 to lower limit 614 within a predetermined period of time, for example, 1 to 3 seconds, then the method determines that motor vehicle 100 has suddenly entered a dark location and the method proceeds to step 1006 where the illumination characteristics are rapidly changed. A timer can be started when the ambient light level crosses the upper limit 612 and stopped when the lower limit is reached. The elapsed time can be compared with the predetermined time.

In step 806 central unit 302 switches one or more illuminated components to a nighttime illumination level in X seconds. Preferably, X seconds is shorter than the time it takes central unit 302 to normally switch to a nighttime illumination level under normal, gradual circumstances. In a preferred embodiment, X can range between 0.5 seconds and 6 seconds, and in an exemplary embodiment, X is about 3 seconds. In contrast, central unit 302 preferably includes a normal response time, which can take anywhere from 15 seconds to 90 seconds to enter a nighttime mode when there is a gradual decrease in the ambient light level. In an exemplary embodiment, central unit 302 takes about 30 seconds to change the illumination characteristics of an illuminated component when there is a gradual decrease in the ambient light level.

Lower portion 604 is a graph of brightness and time. The vertical axis of lower portion 604 is brightness expressed as a percentage of total maximum brightness. Lower portion 604 shows a comparison of the two exemplary embodiments, where X is about 3 seconds and the normal response time is about 30 seconds. Comparing the special response time of step 806, about 3 seconds in an exemplary embodiment, with the normal response time, about 30 seconds in an exemplary embodiment, the advantage of the special response time of step 806 can be readily observed. In the exemplary embodiment, the method shown in FIG. 8 can improve the response time of an illuminated device by about 27 seconds when motor vehicle 100 experiences a rapid change in ambient illumination.

After one or more of the illuminated components has been switched into nighttime mode, the method proceeds to step 812 where the method exits the algorithm.

Returning to step 802, if light sensor 202 indicates that the amount of ambient light is in between upper threshold 612 and lower threshold 714, then the method proceeds to step 812 and exits the algorithm. However, if the amount of ambient light is less than lower limit 714, indicating a dark or nighttime condition, the method proceeds to step 808 where the method determines how quickly the ambient light level changes.

In step 808, the method determines how long it takes for the ambient light level to move from lower limit 714 to upper limit 712. If the ambient light level moves from lower limit 714 to upper limit 712 in a predetermined period of time, for example, 1 to 3 seconds, then the system determines that motor vehicle 100 has suddenly moved from a dark location to a brightly lit environment. A timer can be started when the ambient light level crosses the lower limit 714 and stopped when the upper limit 712 is reached. The elapsed time can be compared with the predetermined time.

Assuming that the criteria of step 808 has been satisfied, the method proceeds to step 810 where central unit 302 switches one or more illuminated components to a daytime illumination level in X seconds. Preferably, X seconds is shorter than the time it takes central unit 302 to normally switch to a daytime illumination level under normal, gradual circumstances. In a preferred embodiment, X can range between 0.5 seconds and 6 seconds, and in an exemplary embodiment, X is about 3 seconds. In contrast, central unit 302 can normally take anywhere from 15 seconds to 90 seconds to enter a daytime mode when there is a gradual increase in the ambient light level. In an exemplary embodiment, central unit 302 takes about 30 seconds to change the illumination characteristics of an illuminated component when there is a gradual decrease in the ambient light level. After step 810, the process moves to step 812, where the tunnel algorithm is exited.

Lower portion 704 shows a comparison of the two exemplary embodiments where X is about 3 seconds and the normal response time is about 30 seconds. Comparing the special response time of step 810, about 3 seconds in an exemplary embodiment, with the normal response time of about 30 seconds in an exemplary embodiment, the advantage of the special response time of step 810 can be readily observed. In the exemplary embodiment, the method shown in FIG. 8 can improve the response time of an illuminated device by about 27 seconds when motor vehicle 100 experiences a rapid change in ambient illumination.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A method for controlling at least one interior illumination device of a motor vehicle comprising an ambient light sensor providing ambient light information related to ambient light, the method comprising the steps of:
    retrieving the ambient light information from the ambient light sensor;
    determining when the ambient light information crosses a first threshold;
    starting a timer;
    stopping the timer when the ambient light information crosses a second threshold, and computing an elapsed time;
    comparing the elapsed time with a predetermined time;
    and altering a condition of the illumination device if the elapsed time is less than the predetermined time.

2. The method according to claim 1, wherein the condition is related to an illumination level of the interior illumination device.

3. The method according to claim 1, wherein the first threshold is a lower threshold corresponding to a nighttime ambient light level.

4. The method according to claim 3, wherein the second threshold is an upper threshold corresponding to a daytime ambient light level.

5. The method according to claim 4, wherein the illuminated device is switched to a day mode.

6. The method according to claim 1, wherein the first threshold is an upper threshold corresponding to a daytime ambient light level.

7. The method according to claim 6, wherein the second threshold is a lower threshold corresponding to a nighttime ambient light level.

8. The method according to claim 7, wherein the illuminated device is switched to a night mode.

9. The method according to claim 1, wherein the illuminated device is altered more rapidly than a normal response time.

10. The method according to claim 9, wherein the illuminated device is altered in about three seconds.

11. The method according to claim 9, wherein the normal response time is about 30 seconds.

* * * * *